(12) United States Patent
Kawamura (10) Patent No.: US 8,936,421 B2
(45) Date of Patent: Jan. 20, 2015

(54) LOCKING STRUCTURE OF SCREW FASTENING BLOCK

(71) Applicant: Yazaki Corporation, Tokyo (JP)

(72) Inventor: Yukihiro Kawamura, Makinohara (JP)

(73) Assignee: Yazaki Corporation, Tokyo (JP)

( * ) Notice: Subject to any disclaimer, the term of this patent is extended or adjusted under 35 U.S.C. 154(b) by 54 days.

(21) Appl. No.: 13/759,438

(22) Filed: Feb. 5, 2013

(65) Prior Publication Data

US 2013/0202380 A1 Aug. 8, 2013

(30) Foreign Application Priority Data

Feb. 7, 2012 (JP) ................................. 2012-024092

(51) Int. Cl.
*F16B 37/04* (2006.01)
*F16B 41/00* (2006.01)
*H01R 9/24* (2006.01)
*H01R 4/34* (2006.01)
*H01R 11/12* (2006.01)

(52) U.S. Cl.
CPC ............. *F16B 41/002* (2013.01); *F16B 37/043* (2013.01); *H01R 9/24* (2013.01); *H01R 4/34* (2013.01); *H01R 11/12* (2013.01)
USPC ........................................... 411/103; 411/107

(58) Field of Classification Search
USPC ................................................. 411/103, 107
See application file for complete search history.

(56) References Cited

U.S. PATENT DOCUMENTS

| 2,745,458 | A | * | 5/1956 | Bedford, Jr. ................... 411/107 |
| 5,017,068 | A | * | 5/1991 | Cooksey ......................... 411/373 |
| 5,088,940 | A | * | 2/1992 | Saito ......................... 439/620.34 |
| 5,302,070 | A | * | 4/1994 | Kameyama et al. .......... 411/437 |
| 5,816,762 | A | * | 10/1998 | Miura et al. ................... 411/433 |
| 6,322,376 | B1 | * | 11/2001 | Jetton ........................... 439/76.2 |
| 7,156,598 | B2 | * | 1/2007 | Tibbenham et al. ............ 411/82 |
| 2011/0094767 | A1 | | 4/2011 | Asao | |

FOREIGN PATENT DOCUMENTS

| JP | 06-276648 A | 9/1994 |
| JP | 2009-089530 A | 4/2009 |
| JP | 2011-097707 A | 5/2011 |

* cited by examiner

*Primary Examiner* — Roberta Delisle
(74) *Attorney, Agent, or Firm* — Edwards Wildman Palmer LLP (57) ABSTRACT

A locking structure of a screw-fastening block includes: a screw-fastening block made by providing a screw member for screwing and connecting a bus bar, a terminal, or the like on an upper portion of a screw-fastening block main body; and an electrically connecting block main body having a receiver into which the screw-fastening block is inserted upward side and in which the screw-fastening block is received. Locking portions are provided on both sidewalls of the receiver, and a bottom surface of the screw-fastening block main body is a lock-receiving portion to be engaged with the locking portion. The locking portions are locking arms projected obliquely upward from the both sidewalls, and a tip end of the locking arm is provided with a locking surface for supporting the bottom surface of the screw-fastening block main body, and a projecting piece for supporting a side surface of the screw-fastening block main body.

1 Claim, 7 Drawing Sheets

LOCKING STRUCTURE OF SCREW FASTENING BLOCK

CROSS REFERENCE TO RELATED APPLICATIONS

This application is on the basis of Japanese Patent Application No. 2012-024092, the contents of which are hereby incorporated by reference.

TECHNICAL FIELD

The present invention relates to a locking structure of a screw-fastening block for, for example, locking the screw-fastening block with an electrical junction box main body for screw-connecting an outer terminal to a bus bar of the electrical junction box.

BACKGROUND ART

Conventionally, various screw-fastening block structures are proposed for connecting a conductive-metal-made bus bar in an electrical junction box to an external terminal with an electric wire via the screw-fastening block.

For example, in PTL 1 (not shown), it is described that a screw-fastening block is made by assembling a stud bolt with a synthetic-resin-made substantially box-shaped bolt cover. The bolt cover has an engaging projection on an outer surface of a vertical sidewall. While the screw-fastening block is inserted upward from a bottom into a set hole (space) of a case main body of a fuse box (electrical junction box), and the stud bolt penetrates a hole of a conductive-metal-made bus bar disposed over the set hole, the engaging projection of the bolt cover is moved over and engaged with a locking projection on an inner wall of the set hole, and the stud bolt is inserted into a hole of a power input terminal with an electric wire over the bus bar, and then the bus bar and the power input terminal are fastened to the stud bolt with a nut so as to be connected to each other.

Further, in PTL 2 (not shown), it is described that a screw-fastening block is composed of a stud bolt and a resin-made block-shaped supporting member. The supporting member has a locking projection and a slider on one sidewall. While the slider is engaged with a slide guide on a sidewall of a box main body of a relay box (electrical junction box) from a bottom, the locking projection is engaged with an arm-shaped elastic locking piece on the sidewall. The stud bolt penetrates a hole of a bus bar upward, and the bus bar is inserted into a hole of the terminal with an electric wire. The bus bar and the terminal are fastened to the stud bolt with a nut so as to be connected to each other. The terminals of the bus bar are connected to a fusible link on the box main body and a terminal of a fuse.

Further, in PTL 3 (not shown), it is described that a screw-fastening block is made by assembling a nut with a resin-made nut holder. The nut holder has a guide projecting wall and an elastic arm-shaped locking piece on one side surface. While the screw-fastening block is inserted upward from a bottom into an insulating block of an electrical junction box, the locking piece is moved over and engaged with a locking projection on an inner wall of the insulating block, and a bolt is inserted into holes of two bus bars and an external terminal with an electric wire on a nut. The external terminal and the both bus bars are fastened with a nut so as to be connected to each other. The terminals of the bus bars are connected to a fusible link on the insulating block and a terminal of a fuse.

Figure 7:
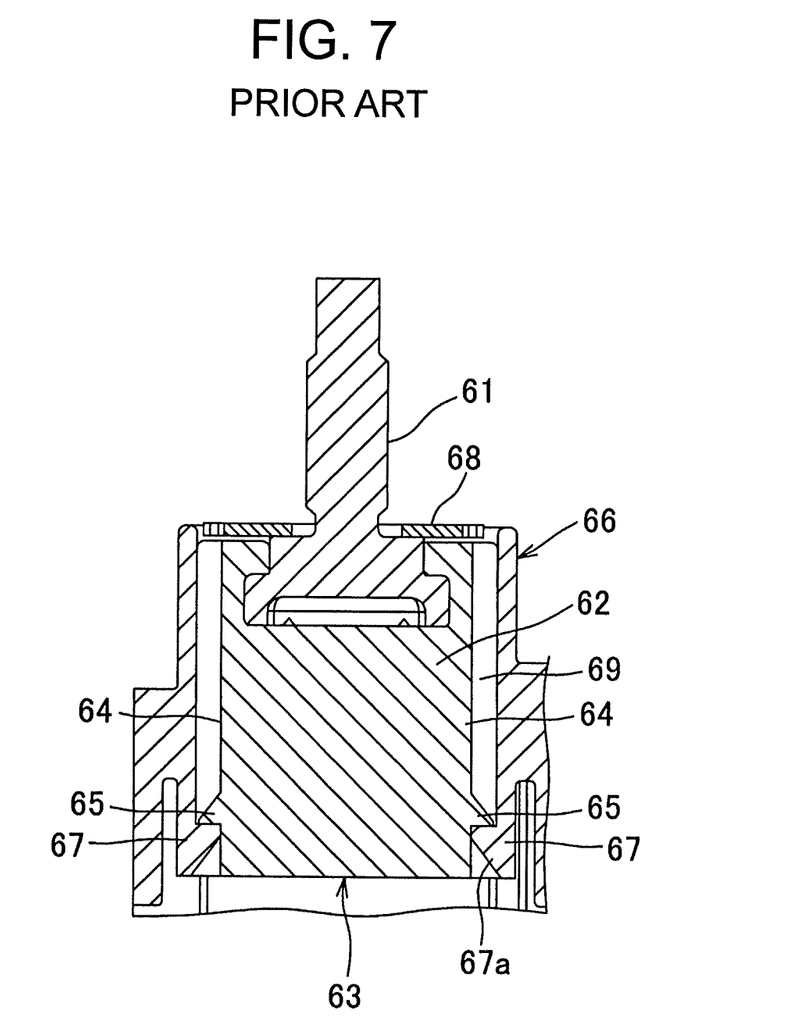
FIG. 7 is a vertically sectional view showing an embodiment of a conventional locking structure of a screw-fastening block.

FIG. 7 shows an embodiment of a conventional locking structure of a screw-fastening block.

According to this locking structure of a screw-fastening block, a screw-fastening block (bolt block) 63 is composed of a synthetic-resin-made rectangular-shaped screw-fastening block main body 62 and a bolt 61. A pair of locking projections 65 is provided on both sidewalls 64 of the screw-fastening block main body 62. An elastic locking arm 67 is provided downward on an inner wall of a screw-fastening block receiver 66 of an electrically connecting block main body. A conductive-metal-made bus bar 68 is arranged on an upper end of the receiver 66. While the screw-fastening block 63 is inserted into the receiver 66 upward from a bottom, and a thread of the bolt 61 penetrates a hole of the bus bar 68, the locking projection 65 is moved over and engaged with a projection 67a of the locking arm 67.

The locking projections 65 are arranged in vertical grooves 69 provided on sidewalls of the screw-fastening block main body 62. The reason why the screw-fastening block 63 is inserted into the receiver 66 upward from a bottom is because the screw-fastening block 63 cannot be inserted downward from a top by obstruction of the upper bus bar 68. The electrically connecting block main body may be referred as the electrical junction box main body.

CITATION LIST

Patent Literature

PTL 1: JP, A, 2011-97707
PTL 2: JP, A, 1106-276648
PTL 3: JP, A, 2009-89530

SUMMARY OF INVENTION

Technical Problem

However, in the above conventional locking structure of a screw-fastening block (similar to structures of screw-fastening blocks of the above patent literatures), it is necessary to provide the locking arm 67 on the receiver 66 of the electrically connecting block main body in a manner to align the locking arm 67 with the locking projection 65 of the screw-fastening block 63, and to provide the locking projection 65 on the screw-fastening block 63 in a manner to align the locking projection 65 with the locking arm 67 of the electrically connecting block main body. Therefore, locking positions are regulated each other. For example, when the screw-fastening block 63 is used in another type of the electrically connecting block main body, it is necessary to provide the locking arm 67 on the another type of the electrically connecting block main body may in a manner to align the locking arm 67 with the locking projection 65 of the screw-fastening block 63. Therefore, there is a fear that this may cost higher, a space in the electrically connecting block main body may be reduced, and the locking arm 67 may not be allowed to be provided in view of space limitations.

Further, because the locking projection 65 is provided on the sidewall 64 of the screw-fastening block 63, there is a fear that a horizontal width of the screw-fastening block 63 may be enlarged, and the receiver 66 of the electrically connecting block main body may be also enlarged. Further, for solving this problem, when the vertical groove 69 is provided on the sidewall of the screw-fastening block 63, and the locking projections 65 is provided in the vertical groove, there is a fear that a cost of the screw-fastening block 63 may be increased.

In view of the above problems, an object of the present invention is to provide a locking structure of a screw-fastening block able to increase applicability of the screw-fastening block and to reduce a size and a cost of the screw-fastening block by increasing layout flexibility of a locking portion of an electrically connecting block with respect to the screw-fastening block.

Solution to Problem

For achieving the object, according to a first aspect of the present invention, there is provided a locking structure of a screw-fastening block including:

a screw-fastening block made by providing a screw member for screwing and connecting a bus bar, a terminal, or the like on an upper portion of a screw-fastening block main body; and an electrically connecting block main body having a receiver into which the screw-fastening block is inserted upward from a bottom side and in which the screw-fastening block is received, wherein locking portions are provided on both sidewalls of the receiver, and wherein a bottom surface of the screw-fastening block main body is a lock-receiving portion configured to be engaged with the locking portions.

According to the above configuration, the bottom surface of the screw-fastening block main body works as the lock-receiving portion with respect to a pair of locking portions of the receiver in any position in a circumferential direction of the screw-fastening block main body. Therefore, even when the pair of locking portions is positioned in any position in a circumferential direction of the receiver, the screw-fastening block main body can be locked. Thus, layout flexibility of the locking portion in the receiver with respect to the screw-fastening block is increased. The screw member of the screw-fastening block is a bolt or a nut.

According to a second aspect of the present invention, there is provided the locking structure of a screw-fastening block as described in the first aspect, wherein the locking portions are locking arms projected obliquely upward from the both sidewalls, and wherein a tip end of the locking arm is provided with a locking surface for supporting the bottom surface of the screw-fastening block main body, and a projecting piece for supporting a side surface of the screw-fastening block main body.

According to the above configuration, the bottom surface of the screw-fastening block main body is supported by the locking surface at the tip end of the locking arm, and the side surface of the screw-fastening block main body is supported by an inner surface of the projecting piece at the tip end of the locking arm. Thereby, the screw-fastening block is stably supported in two directions, namely, a vertical direction and a horizontal direction, without being shaken or displaced.

According to a third aspect of the present invention, there is provided the locking structure of a screw-fastening block as described in the second aspect, wherein projecting walls extended inwardly along the side surfaces of the screw-fastening block are formed on the both sidewalls at both sides in a width direction of the locking arms, and the tip end of the locking arm is projected inward from the projecting wall.

According to the above configuration, the both side surfaces of the screw-fastening block main body are supported by each pair of projecting walls on the both sidewalls in the receiver. The locking arm is positioned in between the pair of projecting walls. The tip end (at least the locking surface) of the locking arm is projected inward from the projecting wall and supports a lower end of the screw-fastening block main body. A space between the pair of projecting walls works as a space in which the locking arm is arranged or a space in which the locking arm is bent. When the bus bar, the terminal, or the like are fastened with the screw member of the screw-fastening block, the pair of projecting walls prevent the locking arm from being dropped and deformed in a horizontal width direction, and the screw-fastening block is surely locked.

Advantageous Effects of Invention

According to the invention described in the first aspect, when the bottom surface of the screw-fastening block main body is engaged with the locking portion of the electrically connecting block main body, the locking portion can be positioned in any position in a circumferential direction of the receiver of the electrically connecting block main body. Thereby, the screw-fastening block can be used in the receiver of the other electrically connecting block main body. Further, because it is unnecessary to provide a lock-receiving projection on the screw-fastening block main body, a size and a cost of the screw-fastening block can be reduced.

According to the invention described in the second aspect, when the locking surface at the tip end of the locking arm supports the bottom surface of the electrically connecting block main body, and the projecting piece at the tip end of the locking arm supports the side surface of the electrically connecting block main body, the electrically connecting block main body is stably supported in two direction, namely, the vertical direction and the horizontal direction by the locking arm without being shaken or the like.

According to the invention described in the third aspect, the projecting wall prevents the locking arm from being dropped in the horizontal direction upon screw-fastening, and the screw-fastening block can be surely locked with the locking arm.

These and other objects, features, and advantages of the present invention will become more apparent upon reading of the following detailed description along with the accompanied drawings.

DESCRIPTION OF EMBODIMENTS

Figure 1A:
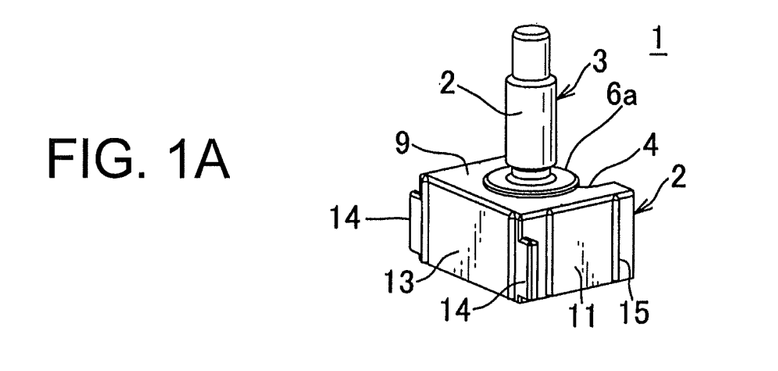
FIG. 1A is a top perspective view showing an embodiment of a screw-fastening block in a locking structure of a screw-fastening block according to the present invention.

FIGS. 1A to 6 show an embodiment of a locking structure of a screw-fastening block according to the present invention. FIGS. 1A to 1C show an embodiment of the screw-fastening block.

Figure 1B:
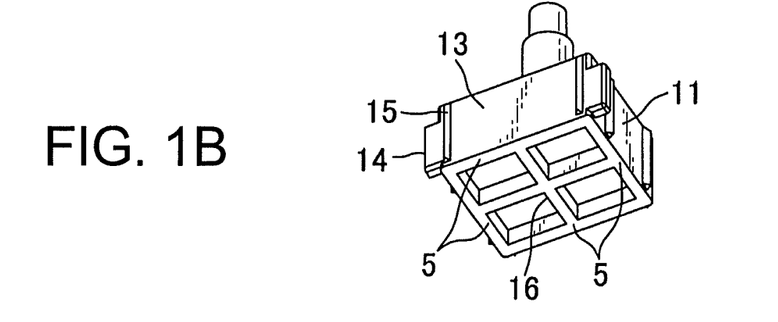
FIG. 1B is a bottom perspective view showing the screw-fastening block shown in FIG. 1A.
Figure 1C:
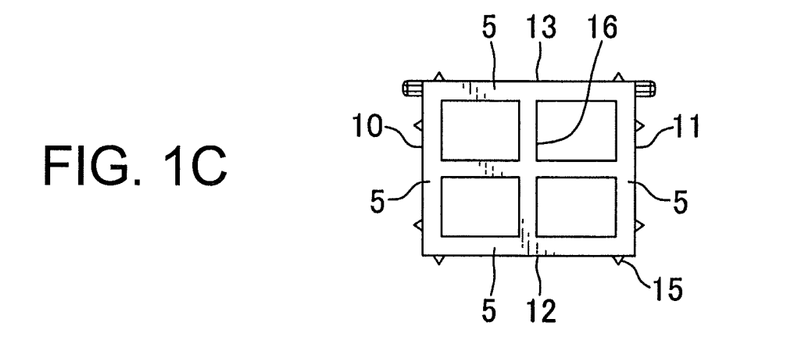
FIG. 1C is a bottom view showing the screw-fastening block shown in FIG. 1A.

As shown in FIGS. 1A to 1C, a screw-fastening block 1 includes: a synthetic-resin-made rectangular-shaped screw-fastening block main body 2; and a metallic bolt (screw member) 3 assembled and fixed to a horizontal groove 4 provided on an upper half of the screw-fastening block main body 2. A whole of a bottom surface 5 (FIGS. 1B, 1C) of the screw-fastening block main body 2 is a lock-receiving portion with respect to a locking portion of a later-described electrically connecting block main body. A conventional locking projection (FIG. 7) is not provided on the screw-fastening block main body 2.

Similar to the conventional way (FIG. 7), the bolt 3 is composed of a lower attachment base 6 (FIG. 4) and a screw shaft 7 vertically extended from the attachment base 6. The attachment base 6 is composed of a wide rectangular-flange-shaped lower half 6b and a small-radius circular upper half 6a. The screw shaft 7 is composed of a male screw portion and a pilot portion at a tip end side. The attachment base 6 is horizontally inserted into the upper and lower two-steps-type groove 4 (FIG. 4) of the screw-fastening block main body 2, and stopped by a vertical rib 8 (FIG. 6) at an entrance side of the groove 4. A top surface of the upper half 6a of the attachment base 6 is positioned on the substantially same plane as a top surface 9 of the screw-fastening block main body 2.

The screw-fastening block main body 2 includes: a horizontal top wall 9; front to back and side to side vertical walls 10 to 13; and a horizontal bottom wall 5. (For convenience of explanation, the entrance side of the groove 4 is referred to as left) guide ribs 14 are projected in a longitudinal direction with respect to the screw-fastening block receiver of the later-described electrically connecting block main body (FIG. 2) at front and rear ends of the right side wall 13. A pair of horizontal-triangular-sectional small ribs 15 for preventing shaking in a vertical direction is projected from each outer surface (side surface) of the front to back side to side walls 10 to 13. The small rib is to be abutted on or pressed into an inner surface of the screw-fastening block receiver (FIG. 2).

A reinforcing wall 16 in a cross shape is integrally provided on insides of the front to back side to side walls 10 to 13. A bottom wall is composed of a lower end surface of the front to back side to side walls 10 to 13 and a lower end wall of the reinforcing wall 16. The bottom surface 5 as the lock-receiving portion is the lower end surface of the front to back side to side walls 10 to 13 and formed in a rectangular frame shape.

Figure 2A:
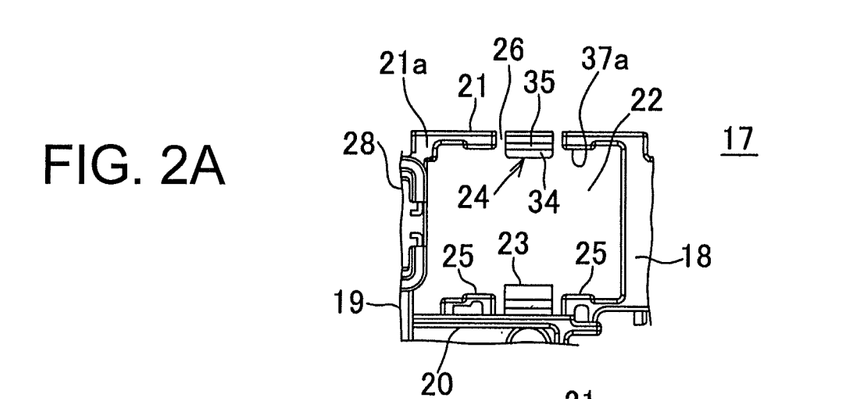
FIG. 2A is a plan view showing a layout of a screw-fastening block receiver and a locking arm in an electrically connecting block main body.
Figure 2B:
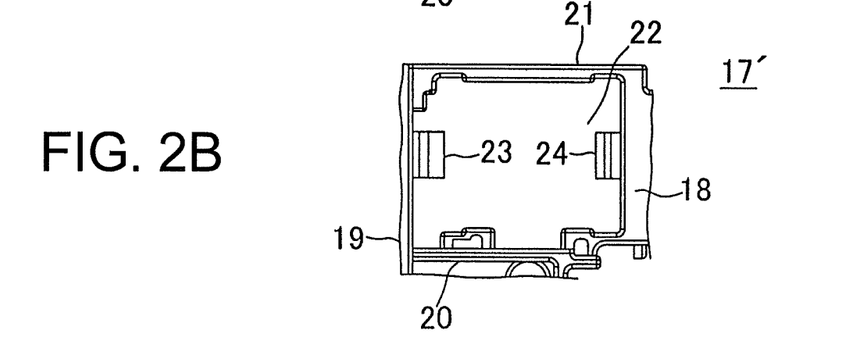
FIG. 2B is a plan view showing another layout of the screw-fastening block receiver and the locking arm in the electrically connecting block main body.

FIGS. 2A and 2b show different embodiments of the screw-fastening block receiver of the electrically connecting block main body.

As shown in FIG. 2A, a screw-fastening block receiver (receiver) 17 includes: synthetic-resin-made front to back and side to side vertical walls (sidewalls) 18 to 21; a receiving chamber 22 surrounded by the vertical walls 18 to 21; and a left and right pair of elastic locking arms (locking portions) 23, 24 projected inward and obliquely upward from the left and right vertical walls 20, 21. The locking arms 23, 24 are also referred to as locking lances.

A pair of vertical projecting walls 25 is integrally formed on an inner surface of the left vertical wall 20 adjacent to the left locking arm 23 at both sides front and rear of the locking arm 23. The right locking arm 24 is separated from the right vertical wall 21 with a slit 26. The right locking arm 24 is projected inward from an inner surface of a wall 27 (FIGS. 4 and 5) continued to an outer surface (rear side) of the right vertical wall 21. The locking arms 23, 24 are arranged at substantially the center of the left and right vertical walls 20, 21 in a longitudinal direction. In FIG. 2A, the reference sign 28 denotes a part of a housing (FIG. 5) integrally continued to an upper side of a rear vertical wall 19.

Figure 6:
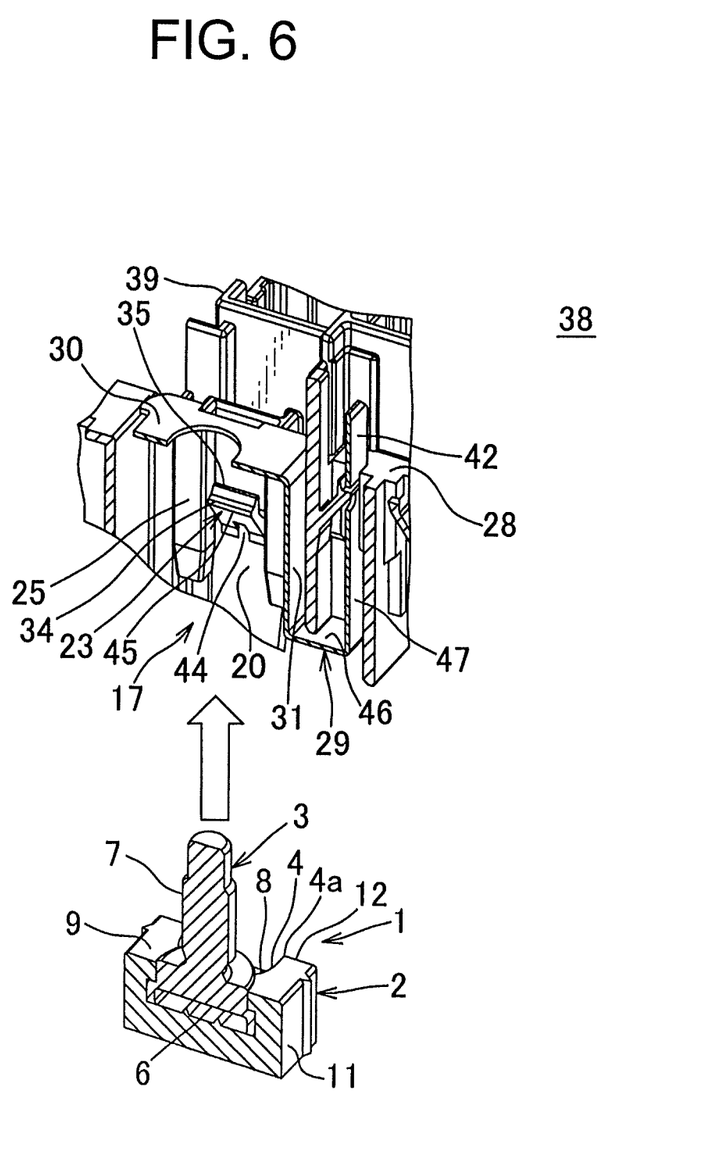
FIG. 6 is a partially sectional perspective view showing a main part of the electrically connecting block.

In FIG. 2A, the locking arms 23, 24 are provided on the left and right vertical walls (sidewalls) 20, 21. However, as an example shown in FIG. 2B, the locking arms 23, 24 may be provided on the vertical walls (sidewalls) 18, 19 in a longitudinal direction of a screw-fastening block receiver 17'. The locking arms 23, 24 in FIG. 2B are formed on a 90 degree inverted position of the locking arms 23, 24 in FIG. 2A, and arranged at substantially the center of the front and rear vertical walls 18, 19 in a horizontal direction. The rear locking arm 23 is arranged in a position so as not to interfere with a vertical plate of a later-described bus bar (FIG. 6). For example, the vertical plate of the bus bar may be notched, and the rear locking arm 23 may be arranged in the notched portion.

Because the lock-receiving portion of the screw-fastening block 1 is not a projection like the conventional screw-fastening block, and is a whole of the bottom surface 5 of the screw-fastening block main body 2, even when the locking arms 23, 24 are arranged front and rear, or left and right, the screw-fastening block 1 can be surely locked independently of the positions of the locking arms 23, 24. Hereinafter in FIGS. 3 to 5, an example shown in FIG. 2A (the locking arms are arranged left and right) will be explained.

Figure 3:
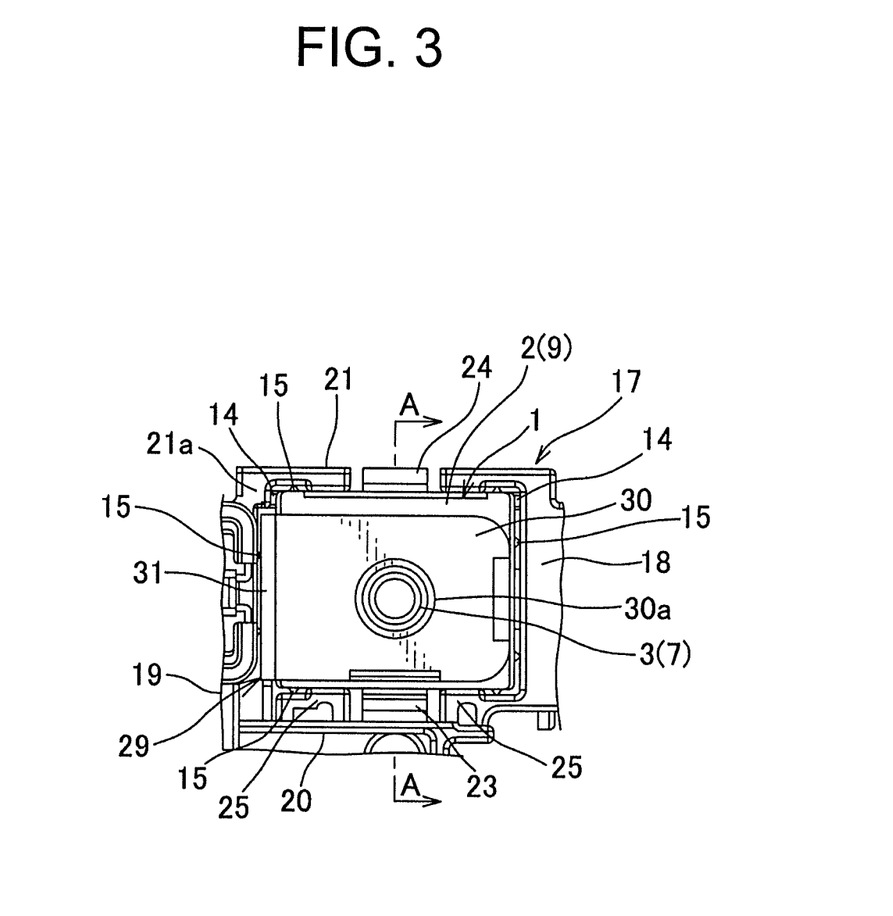
FIG. 3 is a plan view showing a condition that the screw-fastening block is locked in the screw-fastening block receiver.

FIG. 3 shows a condition that the screw-fastening block 1 is inserted upward into the screw-fastening block receiver 17 of the electrically connecting block main body from a bottom, and the bottom surface (lock-receiving portion) 5 of the screw-fastening block main body 2 is locked with the left and right locking arms 23, 24 of the screw-fastening block receiver 17.

The top surface 9 of the screw-fastening block main body 2 is provided with a horizontal plate 30 of a conductive-metallic plate-shaped bus bar 29. A rear end of the horizontal plate 30 is integrally continued to a vertical plate 31 (FIG. 6) of the bus bar 29 extended along an inner surface of the rear vertical wall 19 of the screw-fastening block receiver 17 of the electrically connecting block main body. The screw shaft 7 of the bolt 3 penetrates upward a circular hole 30a at the center of the horizontal plate 30. The top surface 9 of the screw-fastening block main body 2 is exposed at the left, right, and front ends of the horizontal plate 30 of the bus bar 29.

The front and rear guide ribs 14 at the right side of the screw-fastening block main body 2 abuts on a bottom surface of a flange-shaped upper wall 21a at the upper side of the right vertical wall 21 of the screw-fastening block receiver 17, and the top surface 9 of the screw-fastening block main body 2 abuts on a bottom surface of the horizontal plate 30 of the bus bar 29, thereby a further insertion upward of the screw-fastening block 1 is prevented. The small ribs 15 on the outer surfaces of the front to back and side to side vertical walls 10 to 13 of the screw-fastening block main body 2 abut on the inner surfaces of the front to back and side to side vertical walls 18 to 21 of the screw-fastening block receiver 17 (in the right vertical wall 20, in detail, inner surfaces of the projecting walls 25 adjacent to the left locking arm 23 at front and back), thereby the screw-fastening block 1 is prevented from being shaken in the longitudinal direction and the horizontal direction.

Figure 4:
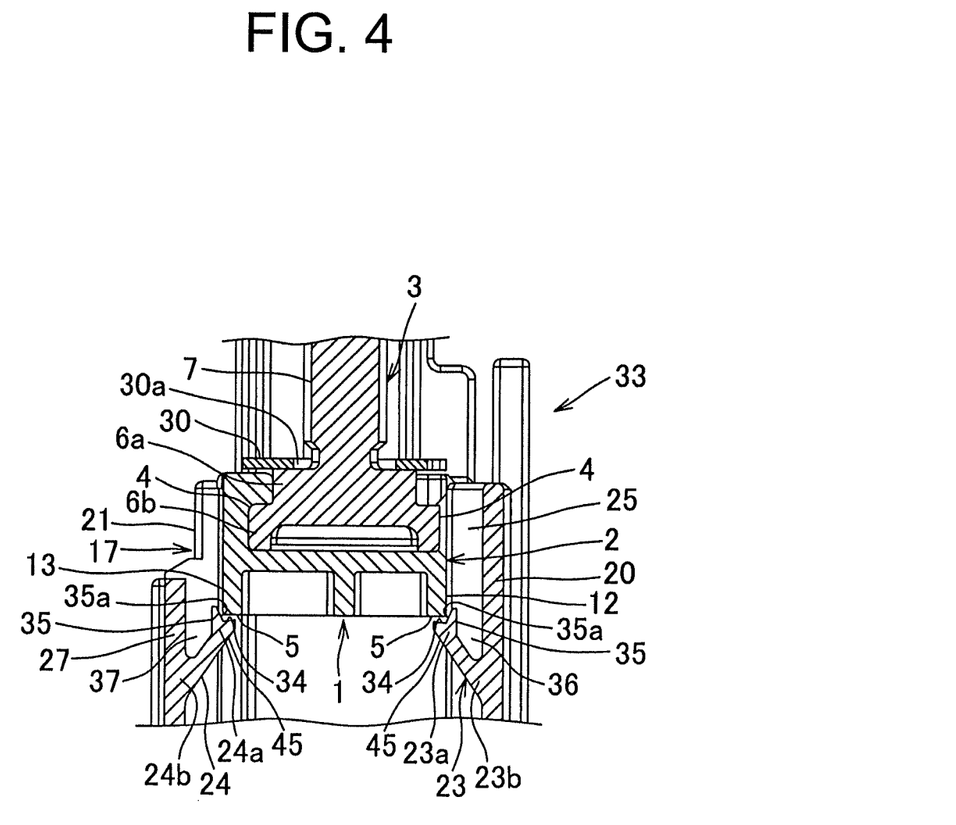
FIG. 4 is a sectional view taken on line A-A of FIG. 3.

FIG. 4 is a sectional view taken on line A-A of FIG. 3 showing a condition that the screw-fastening block 1 is inserted upward into the screw-fastening block receiver 17 of the electrically connecting block main body 33 from a bottom, and the bottom surface (lock-receiving portion) 5 of the screw-fastening block main body 2 is locked with the left and right locking arms 23, 24 of the screw-fastening block receiver 17.

Horizontal locking surfaces 34 of tip ends (top ends or free ends) 23*a*, 24*a* of the left and right pair of locking arms 23, 24 support the bottom surface 5 of the screw-fastening block main body 2, and inner surfaces of the upward projecting pieces 35 substantially perpendicular to (crossing) the locking surfaces 34 at outsides of the locking surfaces 34 abut on the left and right outer side surfaces 12, 13 of the screw-fastening block main body 2 (inner surfaces of the projecting pieces 35 support the outer side surfaces 12, 13 of the screw-fastening block main body 2), thereby the screw-fastening block 1 is stably supported (locked) without falling out and being displaced in the horizontal direction.

The locking arms 23, 24 stably support the screw-fastening block main body 2 in two directions of the vertical direction and the horizontal direction with the locking surfaces 34 at the tip end of the sloped arm main bodies and with the projecting pieces 35 projected upward from the arm main bodies. The left and right locking arms 23, 24 are the same height, the same size, and the same shape and arranged symmetrically. Arm-bending spaces 36 are formed between the inner surfaces of the left and right walls 20, 27 of the screw-fastening block receiver 17 of the electrically connecting block main body 33 and the outer surfaces of the sloped locking arms 23, 24.

The left locking arm 23 is projected obliquely upward from the inner surface of the left vertical wall 20 of the screw-fastening block receiver 17 (a base end of the locking arm 23 is denoted by the reference sign 23*b*). The left outer side surface 12 of the screw-fastening block main body 2 abuts on the inner surfaces of the vertical projecting walls 25 adjacent to the left locking arm 23 at front and rear. The projecting walls 25 are a part of the left vertical wall 20. The locking surface 34 of the locking arm 23 is projected inward further than the projecting walls 25, and an inner surface 35*a* of the upward projecting piece 35 is positioned on the same plane as the inner surface of the projecting walls 25.

The right locking arm 24 is projected obliquely upward from an inner surface of a rear (outside) wall 27 expanded outward at the center of the right vertical wall 21 of the screw-fastening block receiver 17 (a base end of the locking arm 24 is denoted by the reference sign 24*b*). An outer surface of the right vertical wall 13 of the screw-fastening block main body 2 abuts on an inner surface of the right vertical wall 21. The rear wall 27 is a part of the right vertical wall 21. A vertical projecting wall 37 is formed between the inner surface of the right vertical wall 21 and the inner surface of the rear wall 27 (see FIG. 5).

The locking surface 34 of the locking arm 24 is projected inward further than the inner surface of the right vertical wall 21. The inner surface of the upward projecting piece 35 is positioned in the same plane as the inner surface of the right vertical wall 21. Further, the horizontal plate 30 of the bus bar 29 abuts on the upper surface of the attachment base 6 of the bolt 3, and the screw shaft 7 of the bolt 3 is projected upward from the hole 30*a* of the horizontal plate 30.

Figure 5:
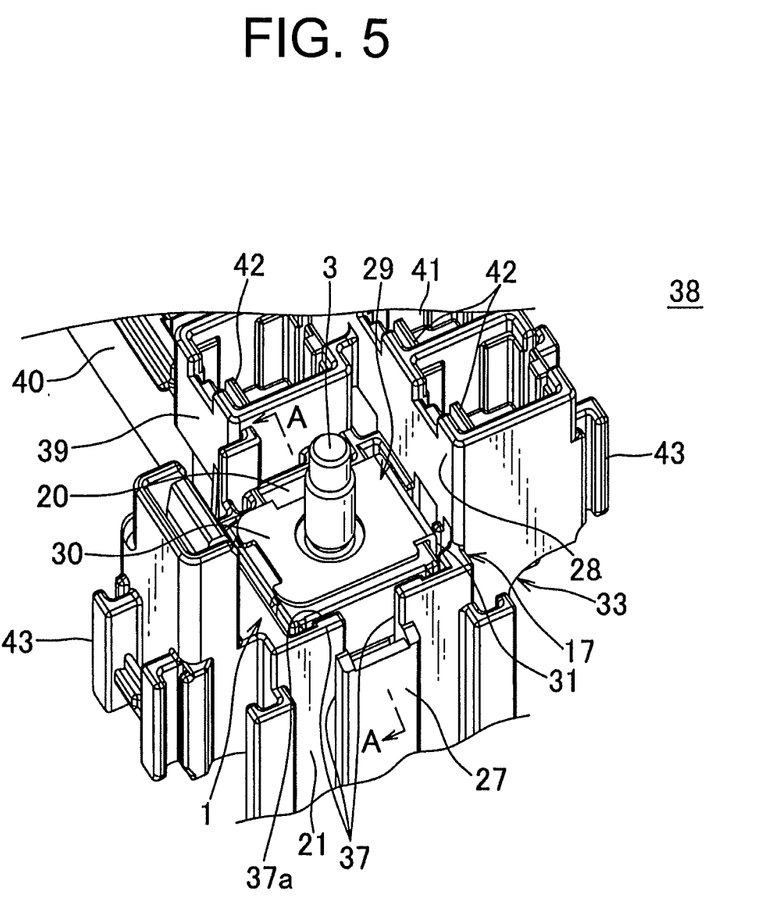
FIG. 5 is a perspective view showing an embodiment of the electrically connecting block assembled with the screw-fastening block.

FIG. 5 shows an outward appearance of the electrically connecting block 38 in a condition that the screw-fastening block 1 is assembled upward with the screw-fastening block receiver 17 of the electrically connecting block main body 33.

The electrically connecting block main body 33 includes: fusible link attachment portions 39, 28 adjacent to a left side and a rear side of the screw-fastening block receiver 17. A plurality of fuse attachment portions 40 is arranged parallel at a left side of the left fusible link attachment portion 39. A plurality of similar fusible link attachment portions 41 is arranged parallel at a left side of the rear fusible link attachment portion 28.

Male terminals 42 of the bus bar 29 are projected upward in the attachment portions 28, 39 to 41. Not-shown electric components such as fusible link or fuse are attached downward from a top in the attachment portions 28, 39 to 41. Thereby, terminals of the electric components are connected to the male terminals 42. The vertical plate 31 is extended downward from the horizontal plate 30 of the bus bar 29, the vertical plate 31 is extended to two rows in a left direction, and the male terminals 42 are extended vertically from an extension of the vertical plate 31.

The upward bolt 3 of the screw-fastening block 1 is opposite to outer walls of the rear and left attachment portions 28, 39. Slide engaging and locking portions 43 with respect to a not-shown frame are provided on a front side of the bolt 3 and on a rear wall of the rear attachment portion 28. The right vertical wall 21 of the screw-fastening block receiver 17 has an outer wall 27 at the center in a width direction. The right vertical wall 21 and the outer wall 27 are connected to each other with the projecting wall 37. The right locking arm 24 (FIG. 4) is provided on an inner surface of the right wall 27 between the front and rear pair of projecting walls 37. The projecting wall 37 is further projected inward from the inner surface of the right (inner) vertical wall 21 (the further projected inward portion is denoted by the reference sign 37*a*). FIG. 4 shows a sectional view taken on line A-A of FIG. 5.

The electrically connecting block main body 33 of this embodiment is closer to an assembly composed of a plurality of component attachment portions than a junction box. An electrical junction box (relay block or fuse block) is made by assembling the component attachment portions upward from a bottom in a not-shown frame, and by attaching not-shown upper and lower covers to the frame.

FIG. 6 shows a vertical section of the screw-fastening block receiver 17 of the electrically connecting block 38.

The left locking arm 23 is arranged between the front and rear pair of projecting walls 25 at the center of the left vertical wall 20 of the screw-fastening block receiver 17. The locking surface 34 at the tip end of the locking arm 23 in a free condition is projected inward further than the inner surface of the projecting wall 25. The upward projecting piece 35 at the tip end of the locking arm 23 is positioned in the same plane as the inner surface of the projecting wall 25, or a little inward further than the inner surface of the projecting wall 25. The screw-fastening block 1 is inserted upward from a bottom into the screw-fastening block receiver 17 as shown by an arrow in FIG. 6. The locking arm 23 is prevented from being dropped or deformed in a width direction of the locking arm 23 by the front and rear pair of projecting walls 25, and surely exerts a locking force with respect to the screw-fastening block 1.

In the locking condition shown in FIG. 4, the locking arms 23, 24 may be bent outward a little by pushing with the screw-fastening block main body 2, and the upward projecting piece 35 may elastically lock the screw-fastening block main body 2 inward. As shown in FIG. 6, the flexibility of the locking arms 23, 24 in this embodiment is increased by having a notch 44 in the center at a base end of each of the locking arms 23, 24. An inner horizontal locking surface 34 and an outer vertical projecting piece 35 are positioned at the tip end of each of the locking arms 23, 24.

When the screw-fastening block 1 is inserted upward from a bottom into the screw-fastening block receiver 17 as shown by an arrow in FIG. 6, left and right upper edges of the screw-fastening block main body 2 slidably abut on inclined inner surfaces (downward sloped surfaces) 45 at the tip ends of the left and right locking arms 23, 24, and push inward and bent inward the locking arms 23, 24. Then, while the screw-fastening block main body 2 is inserted upward, left and right side surfaces 12, 13 of the screw-fastening block main body 2 slidably abut on the inclined surfaces 45 at the tip end of the locking arms 23, 24. As shown in FIG. 4, when the bottom end of the screw-fastening block main body 2 is moved over the tip ends of the locking arms 23, 24, the locking arms 23, 24 are elastically restored inward, the locking surfaces 34 at the tip ends support the bottom surface (bottom end surface) 5 of the screw-fastening block main body 2, and simultaneously, the projecting pieces 35 at the tip ends support inward the left and right side surfaces 12, 13 of the screw-fastening block main body 2.

In this embodiment, because the left upper edge of the screw-fastening block main body 2 is notched by the groove 4 for assembling the bolt (FIG. 6), when a horizontal width of a notch opening 4a is larger than a horizontal width of the left locking arm 23, the inclined surface 45 at the tip end of the left locking arm 23 slidably abuts on a bottom end edge of the notch opening 4a. Thereby, the timings of slidably abutting on the screw-fastening block main body 2 are slightly shifted in between the left and right locking arms 23, 24 (the left locking arm 23 is delayed), and an insertion force of the screw-fastening block 1 into the screw-fastening block receiver 17 of the electrically connecting block main body 33 is reduced and an insertion workability is improved.

The top surface 9 of the screw-fastening block main body 2 abuts on the horizontal plate 30 of the bus bar 29 (FIG. 6), or upper ends of the front and rear ribs 14 of the screw-fastening block main body 2 in FIG. 1 abut on the inner surface of the flange-shaped wall 21a at the upper side of the screw-fastening block receiver 17, thereby a further upward insertion of the screw-fastening block 1 is prevented.

As shown in FIG. 6, the horizontal plate 30 of the bus bar 29 is continued to the rear downward vertical plate 31, the vertical plate 31 is continued to a lower short horizontal plate 46, and the horizontal plate 46 is continued to a rear vertical plate 47. The front and rear vertical plates 31, 47 are extended in a left direction, and the upward male terminals 42 are arranged in the fusible link attachment portions 28, 39 and the fuse attachment portion.

Incidentally, in this embodiment, it is explained that the screw-fastening block 1 is attached to the electrically connecting block main body 33 as a component of the electrical junction box. However, the above locking structure of a screw-fastening block is applicable in a case that the screw-fastening block 1 is attached to an independent small electrically connecting block main body.

Further, in the above embodiment, the bolt block 1 having the bolt 3 is used as the screw-fastening block. However, when a nut is used in a nut block instead of the bolt 3, the locking structure of a screw-fastening block is also applicable. Regarding the nut block, as explained in the conventional embodiment described in PTL 3, for example, it is similar to the screw-fastening block 1 that the nut is attached to or insert-molded in the top of the screw-fastening block main body 2, and the bottom surface 5 of the screw-fastening block main body 2 is the lock-receiving portion. It is possible that the bolt 3 of the screw-fastening block 1 is fixed to the screw-fastening block main body 2 by the insert molding or the like.

Further, in the above embodiment, the locking arms 23, 24 are provided on the inner walls (sidewalls) 19 to 21 (FIG. 2) of the screw-fastening block receiver 17 as the locking portions. However, instead of the locking arms 23, 24, a flexible locking claw, a flexible locking projection, or the like may be provided.

Further, in the above embodiment, the pair of locking arms 23, 24 is used. However, two pair of locking arms, or one left and two right locking arms may be arranged. Alternatively, three of left, right and rear or front locking arms may be arranged. When only one left or right locking arm is used, the locking force is small, and the stability of the screw-fastening block 1 is not good. Therefore, preferably, a left and right or front and rear pair of locking arms 23, 24 may be provided.

Industrial Applicability

The locking structure of a screw-fastening block according to the present invention can be used in order to increase applicability of the screw-fastening block and to reduce a size and a cost of the screw-fastening block by increasing layout flexibility of the locking portion of the electrically connecting block with respect to the screw-fastening block.

The invention has been described in connection with what are, presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention, as set forth by the appended claims.

Reference Signs List
1 screw-fastening block
2 screw-fastening block main body
3 bolt (screw member)
5 bottom surface (lock-receiving portion)
12, 13 side surface
17 screw-fastening block receiver (receiver)
18, 19, 20, 21 sidewall
23, 24 locking arm (locking portion)
25, 37 projecting wall
29 bus bar
33 electrically connecting block main body
34 locking surface
35 projecting piece

What is claimed is:
1. A locking structure of a screw-fastening block comprising:
 a screw-fastening block made by providing a screw member for screwing and connecting a bus bar, a terminal, or the like on an upper portion of a screw-fastening block main body; and
 an electrically connecting block main body having a receiver into which the screw-fastening block is inserted upward from a bottom side and in which the screw-fastening block is received,
 wherein locking portions are provided on both sidewalls of the receiver,
 wherein a bottom surface of the screw-fastening block main body is a lock-receiving portion configured to be engaged with the locking portions,
 wherein the locking portions are locking arms projected obliquely upward from the both sidewalls, wherein a tip end of the locking arm is provided with a locking surface for supporting the bottom surface of the screw-fastening block main body, and a projecting piece for supporting a side surface of the screw-fastening block main body, and wherein projecting walls extended inwardly along the side surfaces of the screw-fastening block are formed on the both sidewalls at both sides in a width direction of the locking arms, and the tip end of the locking arm is projected inward from the projecting wall.

* * * * *